United States Patent
Gu et al.

(10) Patent No.: US 8,035,825 B2
(45) Date of Patent: Oct. 11, 2011

(54) DOCUMENT EDITING DEVICE, PROGRAM, AND STORAGE MEDIUM

(75) Inventors: Yu Gu, Fuchu (JP); Hitoshi Yamakado, Hino (JP); Atsushi Nagahara, Chino (JP); Hirotaka Ohashi, Suwa (JP)

(73) Assignee: Seiko Epson Corporation (JP)

( * ) Notice: Subject to any disclaimer, the term of this patent is extended or adjusted under 35 U.S.C. 154(b) by 1210 days.

(21) Appl. No.: 11/788,047

(22) Filed: Apr. 18, 2007

(65) Prior Publication Data
US 2007/0250770 A1 Oct. 25, 2007

(30) Foreign Application Priority Data
Apr. 21, 2006 (JP) ................. 2006-117796

(51) Int. Cl.
*G06F 15/00* (2006.01)
*G06F 3/048* (2006.01)
(52) U.S. Cl. ...................... 358/1.11; 715/774
(58) Field of Classification Search .............. 358/1.11, 358/1.15, 1.16, 1.18, 1.1, 464; 715/201, 715/234, 210, 236, 800, 774, 205; 382/180, 382/176, 254; 709/219, 224, 223, 225
See application file for complete search history.

(56) References Cited

U.S. PATENT DOCUMENTS
| 5,138,696 | A  | * | 8/1992 | Nagata  | 358/1.11 |
| 7,797,631 | B2 | * | 9/2010 | Yoshida | 715/269  |
| 2006/0282769 | A1 | * | 12/2006 | Bronstein | 715/526 |

OTHER PUBLICATIONS

"Fonts" from URL:http://www.w3.org/TR/CSS21/fonts.html#q1 searched Apr. 3, 2006 as "CSS Specifications".

* cited by examiner

*Primary Examiner* — Saeid Ebrahimi Dehkordy
(74) *Attorney, Agent, or Firm* — Harness, Dickey & Pierce, P.L.C.

(57) ABSTRACT

A document editing device includes: a data set storage unit that stores a plurality of data sets, each including a character string, an attribute of the character string, and a font size for the attribute; a threshold value storage unit that stores a threshold value indicating an acceptable range for a ratio between font sizes for at least two of a plurality of attributes stored in the data set storage unit; a ratio calculation unit that calculates the ratio between the font sizes for at least two of the plurality of attributes stored in the data set storage unit; and a resize unit that changes the font sizes for at least two of the plurality of attributes so as to cause the ratio between the font sizes for at least two of the plurality of attributes to fall within an acceptable range if the ratio calculated by the ratio calculation unit is outside [SN1]the acceptable range indicated by the threshold value stored in the threshold value storage unit.

3 Claims, 8 Drawing Sheets

| IDENTIFIER | ATTRIBUTE | CHARACTER STRING | FONT SIZE |
|---|---|---|---|
| 1 | TITLE | ... | 55 |
| 2 | SUBTITLE | ... | 23 |
| 3 | BODY | ... | 9 |

| | | MINIMUM FONT SIZE RATIO | MAXIMUM FONT SIZE RATIO |
|---|---|---|---|
| $r_{12}$ | TITLE/SUBTITLE | 2.0 | 3.0 |
| $r_{23}$ | SUBTITLE/BODY | 2.0 | 3.0 |
| $r_{13}$ | TITLE/BODY | 4.0 | 7.0 |

TB2

START
↓
INPUT DATA — S10
↓
FONT SIZE CHANGED? — S11
NO ↺ / YES ↓
CALCULATE RATIOS — S12
↓
SET FONT SIZES — S13
↓
END

| ATTRIBUTE | FONT SIZE |
|---|---|
| TITLE | 55 |
| SUBTITLE | 23 |
| BODY | 12 ← CHANGED |

| | | FONT SIZE RATIO |
|---|---|---|
| $r_{12}$ | TITLE/SUBTITLE | 2.4 |
| $r_{23}$ | SUBTITLE/BODY | 1.9 |
| $r_{13}$ | TITLE/BODY | 4.6 |

| ATTRIBUTE | FONT SIZE |
|---|---|
| TITLE | 55 |
| SUBTITLE | 24 |
| BODY | 12 |

| | | FONT SIZE RATIO |
|---|---|---|
| $r_{12}$ | TITLE/SUBTITLE | 2.3 |
| $r_{23}$ | SUBTITLE/BODY | 2.0 |
| $r_{13}$ | TITLE/BODY | 4.6 |

| IDENTIFIER | ATTRIBUTE | CHARACTER STRING | FONT SIZE |
|---|---|---|---|
| 1 | TITLE | ... | 75 |
| 2 | SUBTITLE | ... | 30 |
| 3 | BODY | ... | 12 |

| | | MINIMUM FONT SIZE RATIO | MAXIMUM FONT SIZE RATIO | RECOMMENDED FONT SIZE RATIO TB3 |
|---|---|---|---|---|
| $r_{12}$ | TITLE/SUBTITLE | 2.0 | 3.0 | 2.5 |
| $r_{23}$ | SUBTITLE/BODY | 2.0 | 3.0 | 2.5 |

FIG. 16

| ATTRIBUTE | FONT SIZE | |
|---|---|---|
| TITLE | 75 | ← FIXED |
| SUBTITLE | 30 | |
| BODY | 9 | ← CHANGED |

FIG. 17

| | | FONT SIZE RATIO |
|---|---|---|
| $r_{12}$ | TITLE/SUBTITLE | 2.5 |
| $r_{23}$ | SUBTITLE/BODY | 3.3 |

| ATTRIBUTE | FONT SIZE |
|---|---|
| TITLE | 75 |
| SUBTITLE | 26 |
| BODY | 9 |

| | | FONT SIZE RATIO |
|---|---|---|
| $r_{12}$ | TITLE/SUBTITLE | 2.9 |
| $r_{23}$ | SUBTITLE/BODY | 2.9 |

DOCUMENT EDITING DEVICE, PROGRAM, AND STORAGE MEDIUM

The entire disclosures of Japanese Patent Application No. 2006-117796 filed on Apr. 21, 2006 is expressly incorporated by reference herein.

BACKGROUND

1. Technical Field

The present invention relates to a technique for automatically adjusting a layout in a document production system.

2. Related Art

CSS (Cascading Style Sheet) is an example of a known technique for adjusting a layout in a system for producing a document which includes texts or character strings (cf. "CSS Specifications", searched Apr. 3, 2006 on the Internet at URL: http://www.w3.org/Style/CSS/#specs). Using CSS, character strings can be classified into plural attributes such as "title", "subtitle", "body", etc. Also using CSS, different font sizes can be set for character strings with different attributes, respectively.

The CSS affords two methods for determining a font size: (1) determining a font size on the basis of a size ratio relative to a reference font (hereinafter, font size determination with perfect interaction); and (2) determining a font size on the basis of an absolute value (hereinafter, font size determination without interaction). In the method of font size determination with perfect interaction, a font size is determined on the basis of a font size ratio relative to a font size of a reference attribute. For example, if the reference attribute is "body", the font sizes for "title" and "subtitle" are determined in terms of a magnification ratio in relation to the font size for "body". When the font size for "body" is set, the font sizes for "title" and "subtitle" are automatically determined in relation to the font size for "body". In the other method of font size determination without interaction, font sizes for different attributes are respectively set as absolute values which are independent from one another.

According to the method of font size determination with perfect interaction, each time a font size for an attribute is changed, font sizes for all the other attributes are inevitably changed at the same time. Consequently, a problem occurs, in that processing becomes complex. Inversely, the method of font size determination without interaction gives rise to another problem, that of a user having to set manually the font sizes for all attributes in order to maintain a balance in font sizes between attributes.

SUMMARY

The invention provides a technique for editing a document, which is capable of automatically creating a document having a layout with good visibility without having to necessitate changes to font sizes for all attributes each time a font size is changed.

According to one aspect of the invention, there is provided a document editing device including: a data set storage unit that stores a plurality of data sets, each including a character string, an attribute of the character string, and a font size for the attribute; a threshold value storage unit that stores a threshold value indicating an acceptable range for a ratio between font sizes for at least two of a plurality of attributes stored in the data set storage unit; a ratio calculation unit that calculates the ratio between the font sizes for at least two of the plurality of attributes stored in the data set storage unit; and a resize unit that changes the font sizes for at least two of the plurality of attributes so as to cause the ratio between the font sizes for at least two of the plurality of attributes to fall within the acceptable range if the ratio calculated by the ratio calculation unit is outside an acceptable range indicated by the threshold value stored in the threshold value storage unit.

By the document editing device described above, a document with good visibility can be automatically created without changing font sizes for all attributes.

The document editing device may further include a recommended value storage unit that stores a recommended value for ratios between at least two of the plurality of attributes stored in the data set storage unit, wherein the resize unit may change the font sizes for at least two of the plurality of attributes so that the font sizes fall within the acceptable range and so as to minimize a difference from the recommended value stored in the recommended value storage unit.

Alternatively, the document editing device may further include an input unit that is used to input an instruction for changing at least one of the font sizes stored in the data set storage unit, wherein when the instruction is input by the input unit, the ratio calculation unit may be triggered to start calculation of the ratio between the font sizes.

According to another aspect of the invention, there is provided a computer readable storage medium storing a program causing a computer to function as: a data set storage unit that stores a plurality of data sets, each including a character string, an attribute of the character string, and a font size for the attribute; a threshold value storage unit that stores a threshold value indicating an acceptable range for a ratio between font sizes for at least two of a plurality of attributes stored in the data set storage unit; a ratio calculation unit that calculates the ratio between the font sizes for at least two of the plurality of attributes stored in the data set storage unit; and a resize unit that changes the font sizes for at least two of the plurality of attributes so as to cause the ratio between the font sizes for at least two of the plurality of attributes to fall within the acceptable range if the ratio calculated by the ratio calculation unit is outside the acceptable range indicated by the threshold value stored in the threshold value storage unit.

BRIEF DESCRIPTION OF THE DRAWINGS

Exemplary embodiments of the present invention will be described in detail based on the following figures, wherein:

FIG. 15 shows an example of a recommended value table TB3 according to the second embodiment;

FIG. 16 shows an example of changing a font size;

FIG. 17 shows ratios between font sizes;

DESCRIPTION OF EXEMPLARY EMBODIMENTS

1 First Embodiment

Figure 1:
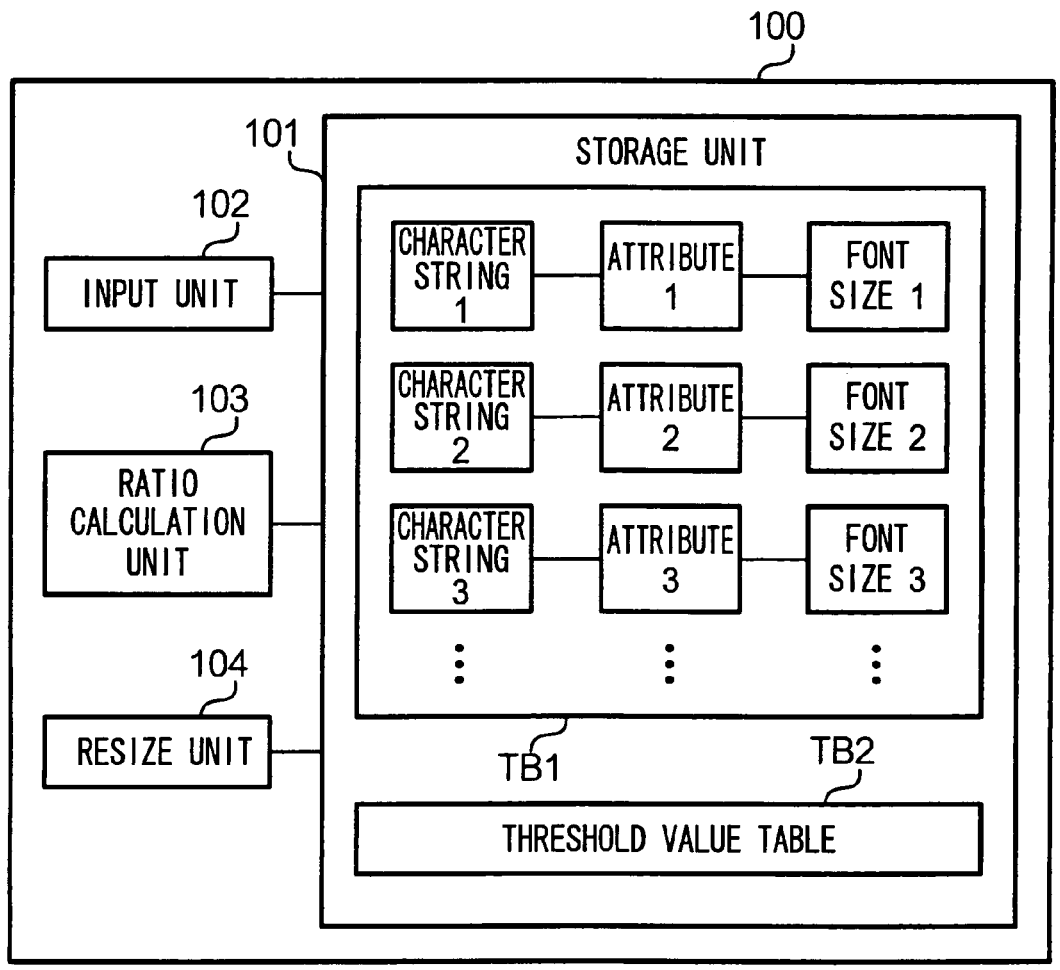
FIG. 1 is a block diagram showing a functional structure of a document editing device 100 according to the first embodiment.

FIG. 1 is a block diagram showing a functional structure of a document editing device 100 according to the first embodiment of the invention. A storage unit 101 stores a data table TB1 and a threshold value table TB2. The data table TB1 includes plural data sets related to a document D, which is a target to be processed. Each data set includes a character string, an attribute of the character string, and a font size related to the attribute. The threshold value table TB2 includes threshold values indicating an acceptable range for a magnification ratio between font sizes for at least two of a plurality of attributes included in the data table TB1. Instructions for changing at least one font size among font sizes stored in the data table TB1 are input from an input unit 102. A ratio calculation unit 103 calculates a ratio between font sizes for at least two attributes among a plurality of attributes stored in the data table TB1. A resize unit 104 changes a font size as a target if the ratio calculated by the ratio calculation unit 103 exceeds a related acceptable range indicated by threshold values stored in the threshold value table TB2. At this time, the resize unit 104 changes the font size so that it falls within the acceptable range.

Figure 2:
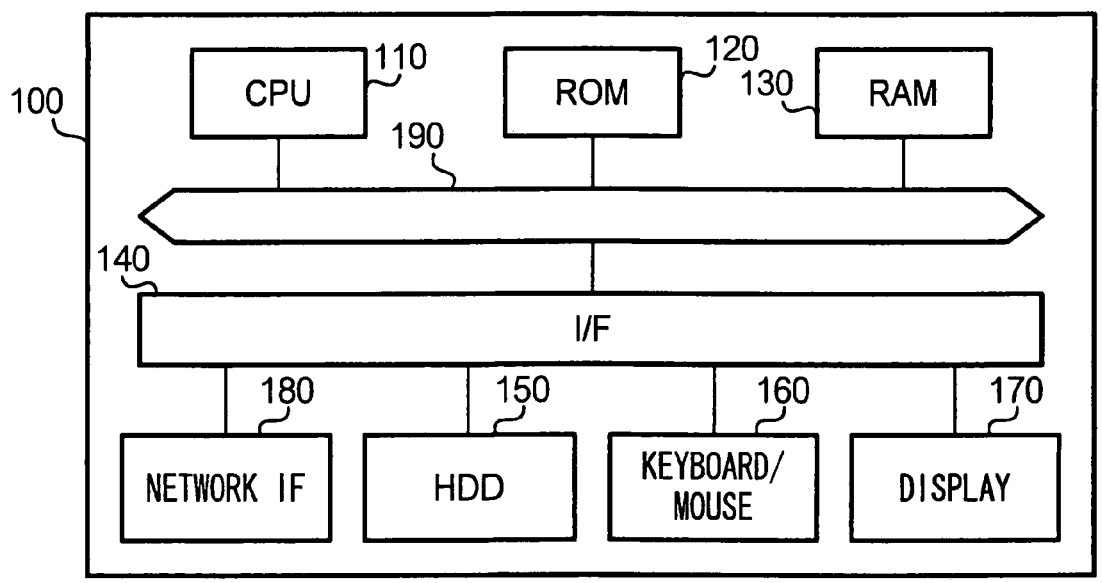
FIG. 2 is a block diagram showing a hardware structure of the document editing device 100.

FIG. 2 is a block diagram showing a hardware structure of the document editing device 100. A CPU (Central Processing Unit) 110 is a control device which controls respective elements constituting the document editing device 100. A ROM (Read Only Memory) 120 is a storage device which stores data and programs required to start up the document editing device 100. A RAM (Random Access Memory) 130 is a storage device which functions as a work area when the CPU 110 executes programs. An I/F (Interface) 140 is an interface through which data and control signals are input/output to/from various I/O (input/output) devices and storage devices. A HDD (Hard Disk Drive) 150 is a storage device which stores various programs and data. As far as the first embodiment is concerned, the HDD 150 also stores a document editing program for editing documents. The HDD 150 stores the data table TB1 and threshold value table TB2. A keyboard/mouse 160 is an input device which allows users to input instructions to the document editing device 100. A display 170 is an output device which displays content of data, processing status, and the like. A network IF 180 is an interface for transferring/receiving data to/from other devices connected via a network (not shown). The document editing device 100 may receive a document (or, more specifically, electronic data expressing a document) via the network and network IF 180. The CPU 110, ROM 120, RAM 130, and I/F 140 are connected mutually via a bus 190. As the CPU 110 executes the document editing program, the document editing device 100 constructs and attains the functional structure shown in FIG. 1.

Figures 3, 4:
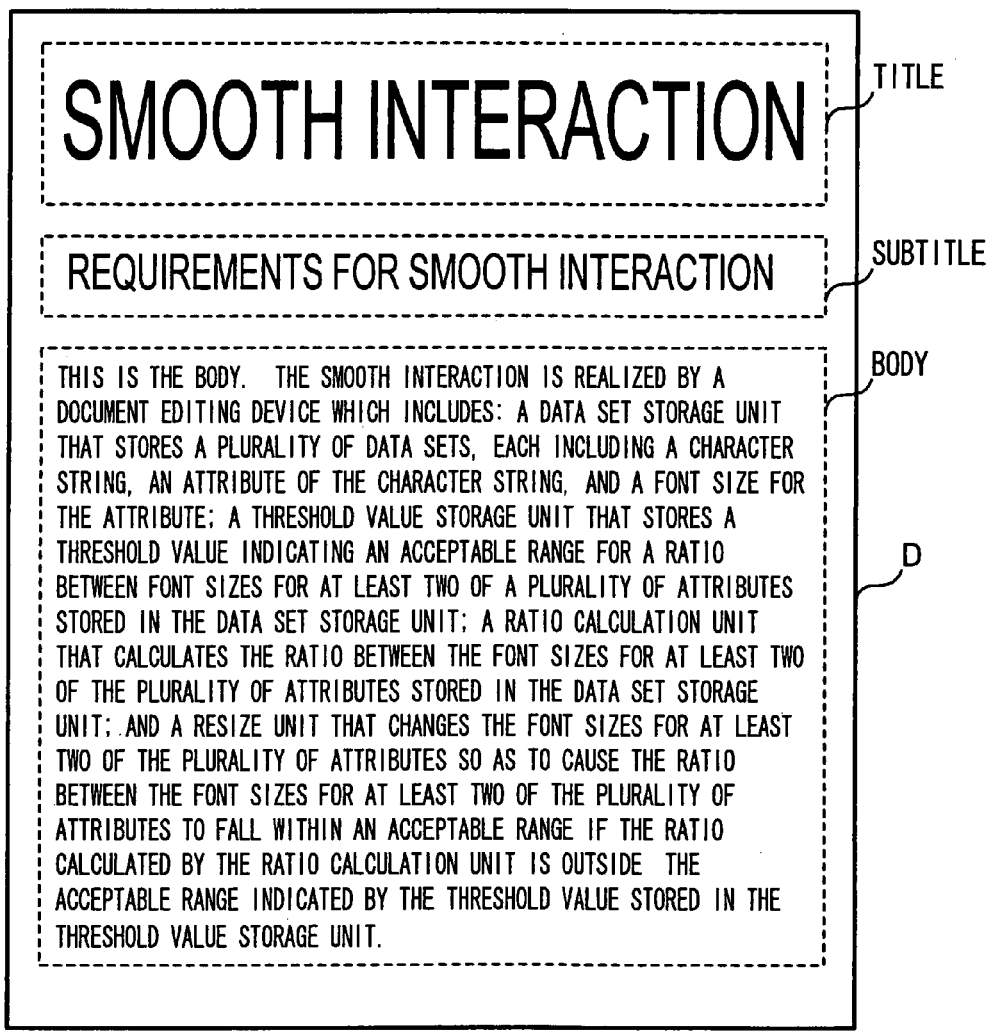
FIG. 3 shows an example of a document D, which is a target to be processed.
FIG. 4 shows an example of a data table TB1 related to the document D.

FIG. 3 shows an example of a document D, which is a target to be processed. FIG. 4 shows an example of the data table TB1 related to the document D. In the first embodiment, the document D is generated by another program module executed by the document editing device 100. Otherwise, a document D may be received from another device via the network (not shown). The document D includes three groups of character strings, which are respectively given attributes such as "title", "subtitle", and "body". In FIG. 3, broken lines indicate areas in which the character strings are located. The contour of each of the areas is called a "frame". As shown in FIG. 4, font sizes for the "title", "subtitle", and "body" are respectively set to the values 55, 23, and 9.

Figures 5, 6, 7, 8:
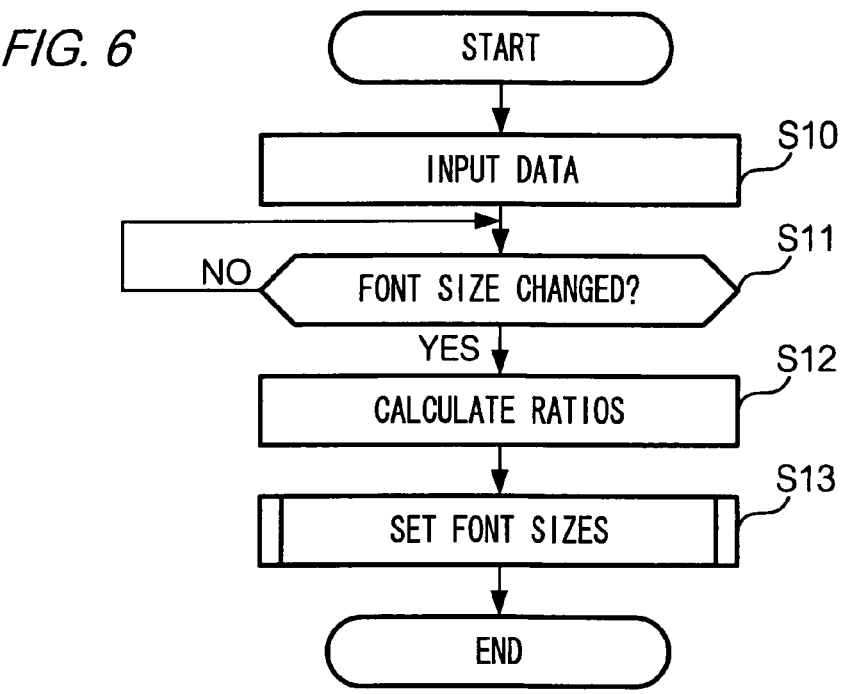
FIG. 5 shows an example of a threshold value table TB2 according to the first embodiment.
FIG. 6 is a flowchart showing an operation of the document editing device 100.
FIG. 7 shows an example of a change made to a font size.
FIG. 8 shows ratios between font sizes.

FIG. 5 is a table showing an example of the threshold value table TB2 according to the first embodiment. In the threshold value table TB2, minimum and maximum values are listed for each font ratio, in order to define an acceptable range of the font ratio. For example, a ratio $r_{12}$ between a font size of a character string having the attribute "title" and a font size of a character string having the attribute "subtitle" is required to satisfy a condition of $2.0 \leq r_{12} \leq 3.0$. In a similar manner, a ratio $r_{23}$ between font sizes for the attributes "subtitle" and "body" is required to satisfy a condition of $2.0 \leq r_{23} \leq 3.0$, as well as a ratio $r_{13}$ between font sizes for the attributes "title" and "body" is required to satisfy a condition of $4.0 \leq r_{13} \leq 7.0$. Equal values can be excluded from relationships between members constituting each of the above conditions. Acceptable ranges listed in the threshold value table TB2 may be obtained, for example, by statistically analyzing font sizes and layouts created by professional designers. Otherwise, the threshold value table TB2 can be prepared by a particular designer. Expression of a ratio "$r_{ij}$" indicates the ratio $r_{ij}=F_i/F_j$ between font sizes $F_i$ and $F_j$.

FIG. 6 is a flowchart showing an operation of the document editing device 100. In a step S10, the CPU 110 of the document editing device 100 stores in HDD 150 data of a document D, which is a target to be processed. In a step S11, the CPU 110 determines whether a change has been made to the font sizes or not. The CPU 110 executes another program module so that a user is allowed to operate the keyboard/mouse 160. The user operates the keyboard/mouse 160, and a control signal corresponding to the user's operation is input to the CPU 110. Based on the control signal, for example, the CPU 110 determines whether a change has been made to font sizes or not. Alternatively, the CPU 110 can determine whether a change has been made to font sizes or not by monitoring differences to data stored in data table TB1.

FIG. 7 shows an example of a change made to a font size. As shown in FIG. 7, the following description will be made referring to a case of inputting an instruction to change the font size of an attribute "body" from 9 in the data table TB1 shown in FIGS. 3 to 12.

Referring again to FIG. 6, if it is determined that a change has been made to a font size (YES in the step S1), the CPU 110 calculates a ratio between font sizes in a step S12.

FIG. 8 shows ratios between font sizes in the example of FIG. 7. As shown in FIG. 8, ratios $r_{12}$, $r_{23}$, and $r_{13}$ between the font sizes are calculated to be 2.4, 1.9, and 4.6, respectively. In this condition, the ratio $r_{23}$ does not comply with the acceptable range listed in the threshold value table TB2.

After calculating the ratios between font sizes, the CPU 110 sets font sizes for respective attributes so that the ratios comply with acceptable ranges, in a step S13.

Figure 9:
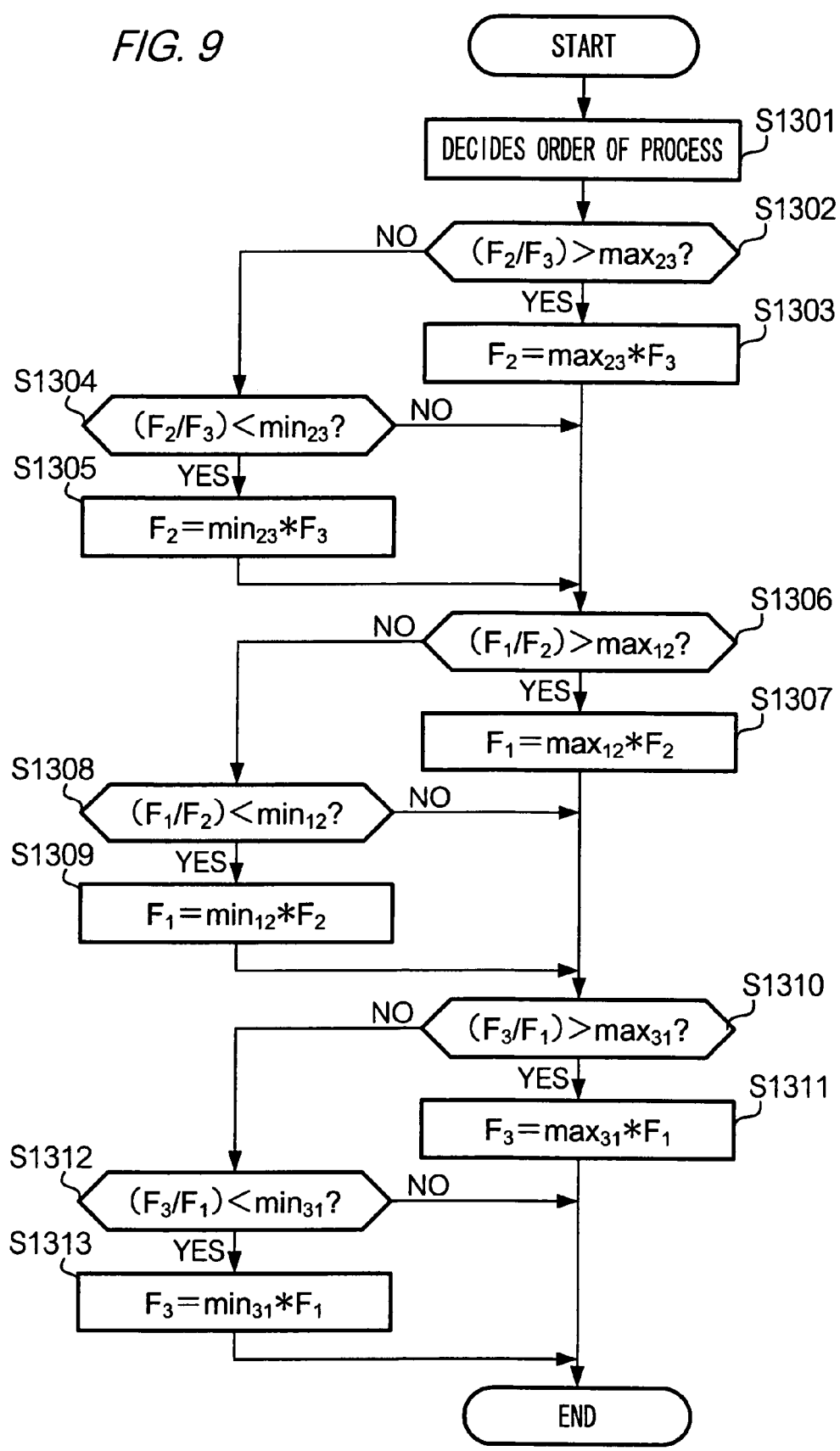
FIG. 9 shows details of font size-setting process.

FIG. 9 shows details of font size-setting process in step S13. In a step S1301, the CPU 110 decides the order of executing the size-setting process on $F_1$, $F_2$, and $F_3$. In a step S1302, the CPU 110 determines whether the ratio $r_{23}$ satisfies $r_{23} \geq \max_{23}$ or not. Parameter "$\max_{ij}$" indicates an acceptable maximum value of ratio $r_{ij}$ and is obtained from the threshold value table TB2. If $r_{23}$ is determined to be greater than $\max_{23}$ (step S1302: YES), the CPU 110 determines the font size $F_2$ for the attribute "subtitle" to be $F_2=\max_{23} \times F_3$. $F_3$ indicates a font size for the attribute "body". If $r_{23}$ is determined to be smaller than $\max_{23}$ (NO in step S1302), the CPU 110 determines whether the ratio $r_{23}$ satisfies $r_{23} \leq \min_{23}$ or not. If $r_{23}$ is determined to be equal to or smaller than $\min_{23}$ (YES in step S1304), the CPU 110 determines the font size $F_2$ to be $F_2=\min_{23} \times F_3$. If $r_{23}$ is determined to be greater than $\min_{23}$ (NO in step S1304), the CPU 110 proceeds to step S1306. Thus, the font size $F_2$ for the attribute "subtitle" is determined by the process of steps S1302 to S1305. In a similar manner, the font size $F_1$ for the attribute "title" is determined by the processes of steps S1306 to S1309, as well as the font size $F_3$ for the attribute "body" is determined by the processes of steps S1310 to S1313. Then, the CPU 110 updates the data table TB1 for document D, which is a target to be processed so as to include the determined font sizes.

Figures 10, 11, 12:
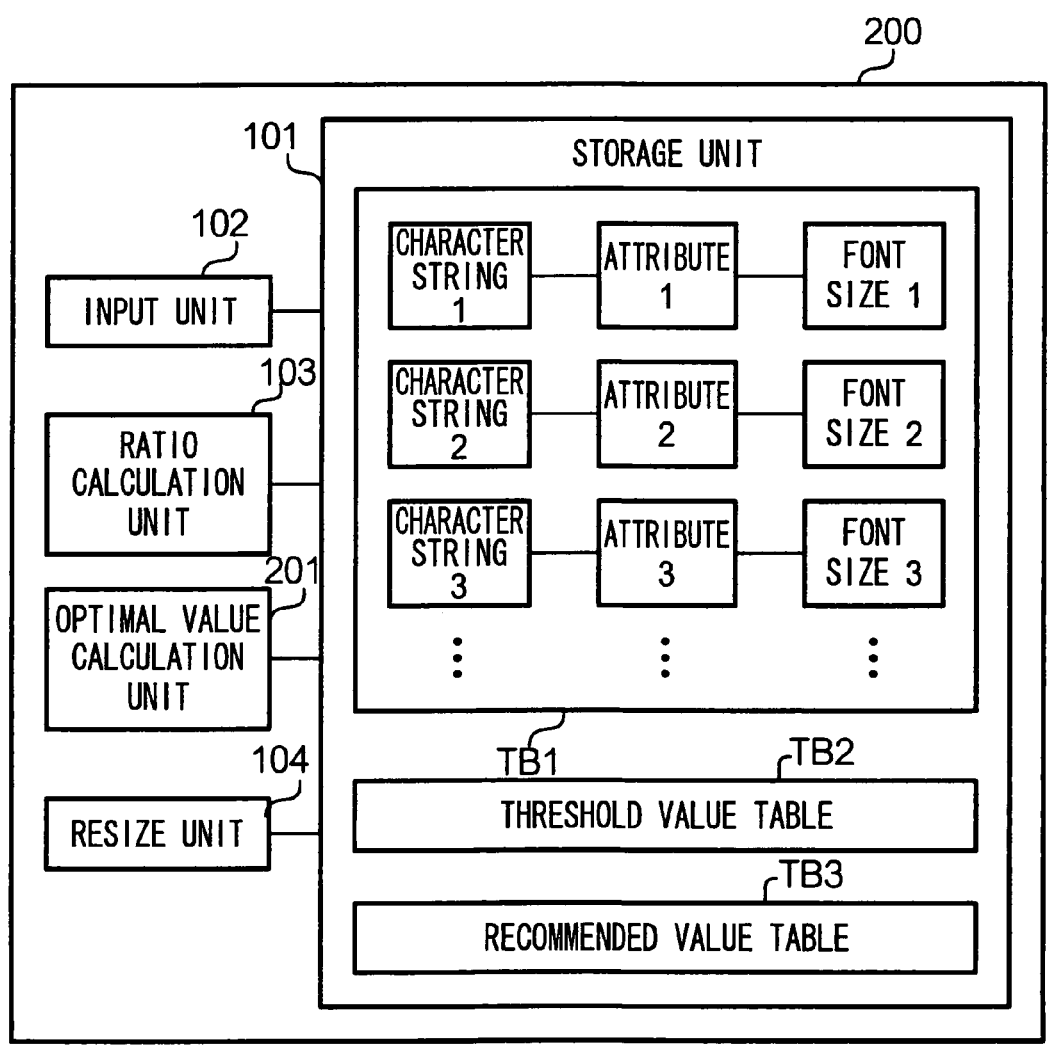
FIG. 10 shows font sizes after the size-setting process has been carried out.
FIG. 11 shows font ratios after the size-setting process has been carried out.
FIG. 12 shows a functional structure of a document editing device 200 according to the second embodiment.

FIG. 10 shows font sizes after the processing of FIG. 9. FIG. 11 shows font ratios after the processing. As the font size for "body" has been changed from 9 to 12, the font size for "subtitle" has been changed from 23 to 24 accordingly. The font size for "title" stays unchanged at 55. This is because the ratios $r_{12}$ and $r_{13}$ fall within acceptable ranges with respect to "body".

The CPU 110 outputs document D updated as described above to another program module. The other program module displays document D on the display 170. Otherwise, the other program module can output document D to an image forming device such as a printer. The image forming device forms an image of document D on a sheet of paper or the like.

As described above, if a font size for an attribute is changed with respect to character strings included in the data table TB1, the document editing device 100 automatically determines font sizes for the other attributes so that font size ratios between respective attributes fall within predetermined acceptable ranges. Even according to related art, when a font size for an attribute is changed, font sizes for all the other attributes are changed accordingly. However, the document editing device 100 of the present invention is further capable of creating a layout with good visibility without having to necessitate changes to font sizes for all attributes.

2 Second Embodiment

The second embodiment of the invention will be described next. Elements common to the first and second embodiments will be omitted from the following description which will include an explanation of the major differences between the first and second embodiments. In the first embodiment, if a font size ratio concerning a changed font size is outside an acceptable range, the font sizes are determined so that the font size ratio is equal to one which is closer to an acceptable maximum and minimum value. In contrast, in the second embodiment, the font sizes are determined so as to satisfy not only a condition where the font size ratios between the font sizes fall within acceptable ranges but also satisfy a condition where the differences between the recommended values and the font size ratios are minimized.

FIG. 12 shows a functional structure of a document editing device 200 according to the second embodiment. A recommended value table TB3 includes recommended values of ratios between font sizes with respect to at least two of a plurality of attributes stored in a data table TB1. An optimum value calculation unit 201 calculates evaluation values based on font size ratios and the recommended values. A resize unit 104 determines font sizes on the basis of the calculated evaluation values.

Figures 13, 14:
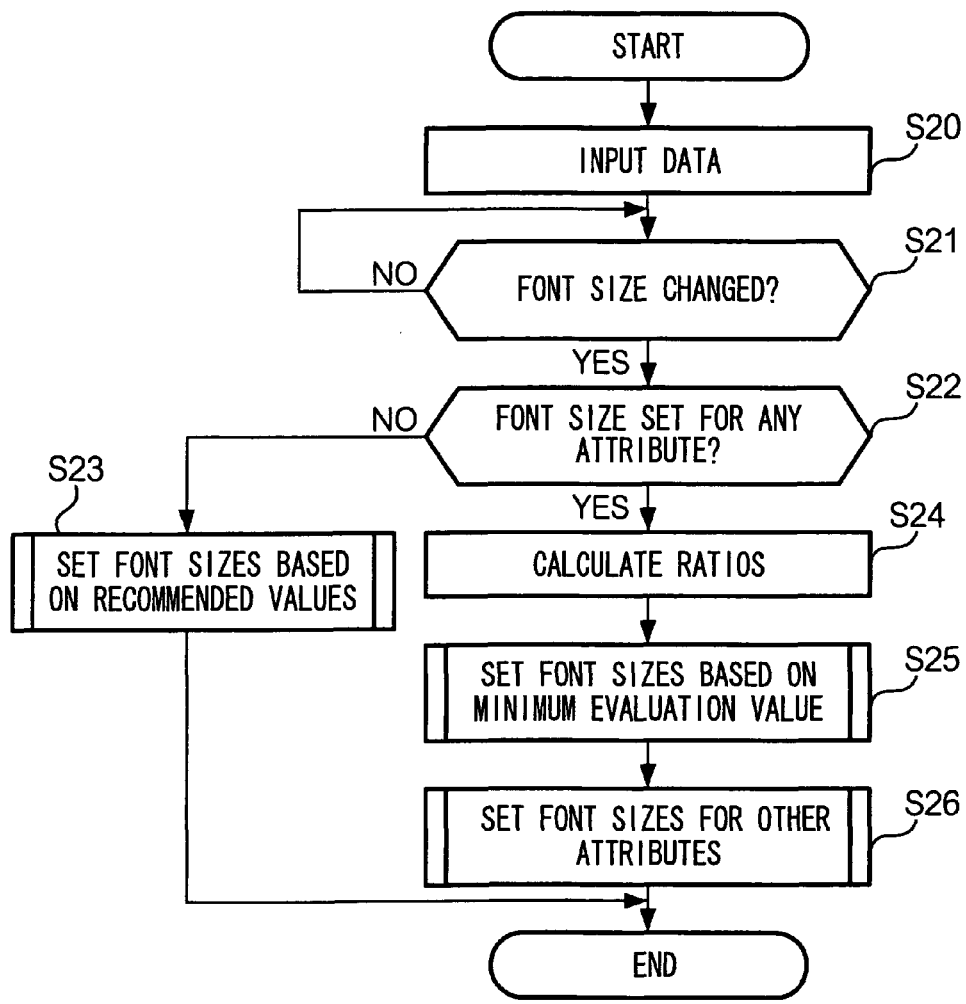
FIG. 13 is a flowchart showing an operation of the document editing device 200.
FIG. 14 shows an example of a data table TB1 according to the second embodiment.

FIG. 13 is a flowchart showing an operation of the document editing device 200. In a step S20, the CPU 110 of the document editing device 200 stores in HDD 150, data of document D, which is a target to be processed. In a step S21, the CPU 110 determines whether a change has been made to the font sizes or not.

FIG. 14 shows an example of a data table TB1 related to document D, which is a target to be processed. In the second embodiment, font sizes for the attributes "title", "subtitle", and "body" are respectively 75, 30, and 12.

FIG. 15 shows an example of a threshold value table TB2 and a recommended value table TB3 according to the second embodiment. In the example of FIG. 15, the threshold value table TB2 and recommended value table TB3 are integrated in one single table (though FIG. 15 is simply titled "TB3"). However, both tables can be stored as separate ones. The table shown in FIG. 15 includes minimum, maximum, and recommended values for ratios $r_{12}$ and $r_{13}$.

FIG. 16 shows an example of a change made to the font sizes. The example will be described referring to a case where an instruction is now input to change the font size for the attribute "body" from 12 to 9 in data table TB1 shown in FIG. 14. Another instruction has been input to fix or keep the font size for the attribute "title" unchanged. The CPU 110 stores in RAM 130 a flag indicating that the font size for the "title" is fixed.

Referring again to FIG. 13, if a change has been made to font sizes (YES in a step S21), the CPU 110 determines whether or not there is any attribute for which the font size has been fixed. If it is determined that there is no attribute for which the font size has been fixed (NO in a step S22), the CPU 110 proceeds to step S23. If there is any attribute for which the font size has been fixed (YES in the step S22), the CPU 110 proceeds to step S24.

In the step S23, the CPU 110 determines the font sizes on the basis of recommended values. Since the font size for "body" is now being changed to 9, the font size for "subtitle" is determined to be 23 so that $r_{23}$ becomes equal to the recommended value $best_{23}=2.5$ (in case of rounding to an integer even though the recommended value can be 22.5 without rounding). The CPU 110 also determines the font size for "title".

In step S24, the CPU 110 calculates the ratios between the font sizes.

FIG. 17 is a table showing the ratios between the font sizes shown in FIG. 16. As shown in FIG. 16, $r_{12}$ and $r_{23}$ are calculated to be 2.5 and 3.3, respectively. According to this condition, $r_{23}$ does not fall into an acceptable range shown in the threshold value table TB2.

Referring again to FIG. 13, the CPU 110 sets font sizes on the basis of minimum evaluation values, in a step S25. Details of this step will now be described.

Figures 18, 19, 20:
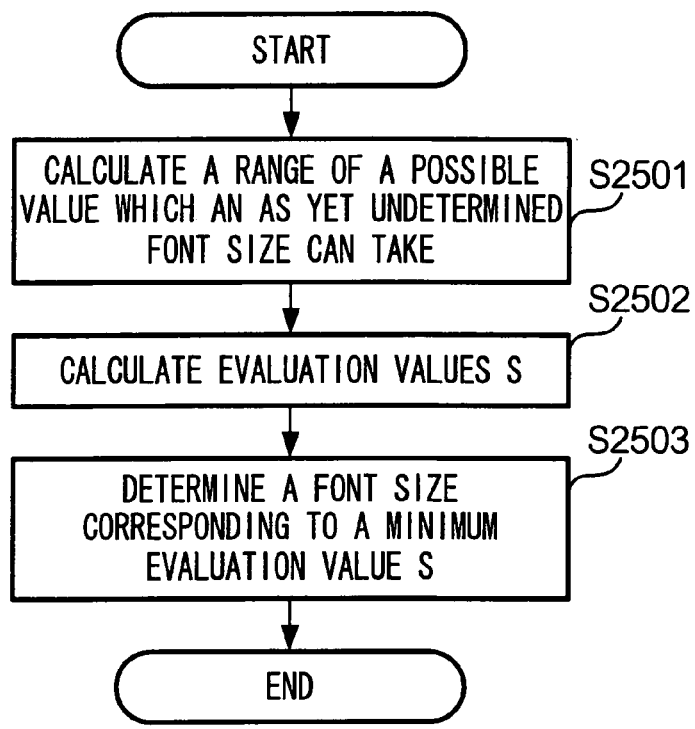
FIG. 18 is a flowchart showing details of font size-setting process.
FIG. 19 shows font sizes after the size-setting process has been carried out.
FIG. 20 shows font ratios after the size-setting process has been carried out.

FIG. 18 is a flowchart showing details of font size-setting process in step S25. In step S2501, the CPU 110 calculates a range of a possible value that an undetermined font size can take. In the second embodiment, an instruction has been input to set the font size $F_1$ for "title". Another instruction has also been input to change the font size $F_3$ for "body". Therefore, the undetermined font size is the font size $F_2$ for "subtitle". The possible range of a value which the font size $F_2$ can take is a partial range common to ranges obtained from both acceptable ranges of the ratios $r_{23}$ and $r_{12}$. First, an acceptable range for the font size $F_2$ which is obtained from the acceptable range of the ratio $r_{23}$ is $[(min_{23} \times F_3), (max_{23} \times F_3)]$. That is, [18, 27] is obtained as an acceptable range of the font size $F_2$ from FIGS. 15 and 16. Second, another acceptable range of the font size $F_2$ which is obtained from the acceptable range of the ratio $r_{12}$ is $[(F_1/max_{23}),(F_1/min_{23})]$. That is, [25, 37.5] is obtained as the acceptable range of the font size $F_2$ from FIGS. 15 and 16. Therefore, the possible range of a value which the font size $F_2$ can take is [25, 27].

In a step S2502, the CPU 110 calculates an evaluation value S to be within the possible range of font size $F_2$. In the second embodiment, the evaluation value S is defined, as following equation (1), as a distance between a font size ratio $(r_{12}, r_{23})$ and a recommended value $(best_{12}, best_{23})$ on the orthogonal coordinate system defined by $r_{12}$ and $r_{23}$:

$$S = \sqrt{(r_{12}-best_{12})^2 + (r_{23}-best_{23})^2} \qquad (1)$$

For example, if the value which a font size can take is limited to integers, integers existing within the range of [25, 27] are three of $F_2$=25, 26, and 27. The CPU 110 substitutes the three integers for $F_2$ in the expression 1 to calculate evaluation values S. In the second embodiment, $F_2$=25, 26, and 27 respectively result in S=0.57, 0.55, and 0.57 (rounded to two decimal places).

In a step S2503, the CPU 110 determines the font size $F_2$ so that it corresponds to a minimum value among the evaluation values S. In the second embodiment, the minimum value of 0.55 is given when the font size is $F_2$=26. Therefore, the CPU 110 determines 26 as the font size $F_2$.

Referring again to FIG. 13, if there still is any attribute for which the font size has not yet been determined, the CPU 110 determines a font size for the attribute in a step S26. The method of determining the font size in this situation is the same as that described in the first embodiment.

FIG. 19 shows font sizes after the process described above has been carried out. FIG. 20 shows font size ratios after the process has been carried out. The font sizes are determined so that they fall within predetermined acceptable ranges and so as to minimize the differences from predetermined recommended values. The CPU 110 updates the data table TB1 so as to include the determined font sizes.

3 Modifications

The invention is not limited to the embodiments described above but may be variously modified in practical phases.

In the first and second embodiments, update of font sizes is triggered when the CPU 110 detects a change to font sizes or detects an instruction about such a change. However, the trigger for updating font sizes is not limited to detection of a change or instruction about a change. For example, font sizes may be updated, triggered by an event where the CPU 110 reads out a document D, which is a target to be processed from the HDD 150. Otherwise, font sizes may be updated upon an event where the document editing device 100 receives a document D, which is a target to be processed from another device via a network.

FIG. 9 shows an algorithm for determining font sizes for plural attributes so that font size ratios fall within acceptable ranges. The algorithm is not limited to that shown in this figure. Any other algorithm can be adopted as long as the font sizes for plural attributes can be determined so that font size ratios fall within acceptable ranges. For example, $F_1$ and $F_2$ which are determined in this order in FIG. 9 can be determined to be in any arbitrary order. Otherwise, the order of font sizes can be determined in accordance with a predetermined rule. If a font size for any attribute has been determined, the CPU 110 can extrude the attribute from targets to be processed.

In the first embodiment, the threshold value table TB2 includes minimum and maximum values with respect to each of the ratios $r_{12}$, $r_{23}$ and $r_{13}$. That is, the threshold value table TB2 includes a minimum value and a maximum value for every combination of two attributes that can be selected from three attributes given to font sizes $F_1$, $F_2$, and $F_3$. However, the threshold value table TB2 need not always include both minimum and maximum values for every selectable combination of attributes. Further, data structures of the data table TB1, threshold value table TB2, and recommended value table TB3 are not limited to those shown in the figures. Each of the tables can have any data structure as long as related data items are linked to one another. In particular, the threshold value table TB2 and recommended value table TB3, which are exemplarily integrated in one table in FIG. 15, can be respectively stored as separate tables.

The document editing program may be provided by a computer readable storage medium, for example, a CD-ROM (Compact Disc Read Only Memory).

What is claimed is:

1. A document editing device comprising:
   a data set storage unit that stores a plurality of data sets, each including a character string, an attribute of the character string, and a font size for the attribute;
   a threshold value storage unit that stores a threshold value indicating an acceptable range for a ratio between font sizes for at least two of a plurality of attributes stored in the data set storage unit;
   a ratio calculation unit that calculates the ratio between the font sizes for at least two of the plurality of attributes stored in the data set storage unit;
   a resize unit that changes the font sizes for at least two of the plurality of attributes so as to cause the ratio between the font sizes for at least two of the plurality of attributes to fall within an acceptable range if the ratio calculated by the ratio calculation unit is outside the acceptable range indicated by the threshold value stored in the threshold value storage unit; and
   a recommended value storage unit that stores a recommended value for the ratio between at least two of the plurality of attributes stored in the data set storage unit, wherein
   the resize unit is configured to change the font sizes for at least two of the plurality of attributes so that the font sizes fall within the acceptable range and so as to minimize a difference in font size from the recommended value stored in the recommended value storage unit.

2. The document editing device according to claim 1, further comprising
   an input unit that is used to input an instruction for changing at least one of the font sizes stored in the data set storage unit, wherein
   when the instruction is input by the input unit, the ratio calculation unit is triggered to start calculation of the ratio between the font sizes.

3. A non-transitory computer readable storage medium storing a program causing a computer to function as:
   a data set storage unit that stores a plurality of data sets, each including a character string, an attribute of the character string, and a font size for the attribute;

a threshold value storage unit that stores a threshold value indicating an acceptable range for a ratio between font sizes for at least two of a plurality of attributes stored in the data set storage unit;

a ratio calculation unit that calculates the ratio between the font sizes for at least two of the plurality of attributes stored in the data set storage unit;

a resize unit that changes the font sizes for at least two of the plurality of attributes so as to cause the ratio between the font sizes for at least two of the plurality of attributes to fall within the acceptable range if the ratio calculated by the ratio calculation unit is outside the acceptable range indicated by the threshold value stored in the threshold value storage unit; and a recommended value storage unit that stores a recommended value for the ratio between at least two of the plurality of attributes stored in the data set storage unit, wherein the resize unit is configured to change the font sizes for at least two of the plurality of attributes so that the font sizes fall within the acceptable range and so as to minimize a difference in font size from the recommended value stored in the recommended value storage unit.

* * * * *